United States Patent

[15] 3,644,118

[45] Feb. 22, 1972

Agnihotri

[54] POLYDIACRYLYL PHOTOSENSITIVE COMPOSITIONS

[72] Inventor: Ram K. Agnihotri, Fishkill, N.Y.

[73] Assignee: International Business Machines Corporation, Armonk, N.Y.

[22] Filed: Aug. 31, 1970

[21] Appl. No.: 68,567

[52] U.S. Cl. ....................96/115 R, 96/91 D
[51] Int. Cl. ....................G03c 1/52, G03c 1/68
[58] Field of Search ....................96/115, 35.1, 91 D

[56] References Cited

UNITED STATES PATENTS

| | | | |
|---|---|---|---|
| 2,861,058 | 11/1958 | Unruh et al. | 96/115 X |
| 2,978,436 | 4/1961 | Jones | 260/63 |
| 3,502,470 | 3/1970 | Delzenne et al. | 96/115 X |

*Primary Examiner*—Ronald H. Smith
*Attorney*—Hanifin and Jancin and Henry Powers

[57] ABSTRACT

A photoresist composition for use in photolithographic and photomechanical processes comprised of either cinnamates or quinone diazide sulfonates of polymeric materials derived by the alkaline condensation of vinyl ketones and acrylates, also referred to as polydiacrylyl methane polymers, and light sensitive elements coated with such compositions.

The cinnamates of the polydiacrylyl methane polymers form negative photoresists, and the diazoquinone sulfonates thereof form positive photoresists.

42 Claims, No Drawings

POLYDIACRYLYL PHOTOSENSITIVE COMPOSITIONS

FIELD OF THE INVENTION

This disclosure relates to photosensitive compositions and more particularly to photoresists based on a polydiacrylyl methane polymeric backbone for photolithographic and photomechanical processes for photomasking systems employed in the fabrication of printed circuits, microcircuits, semiconductors, printing plates, dies and the like normally employed in other lithographic arts.

DESCRIPTION OF THE PRIOR ART

Polydiacrylyl methane polymers which form the backbone on which the photoresists compositions of this invention are based are well known in the prior art. Typical methods for the preparation and a discussion of their properties may be found in U.S. Pat. No. 2,978,436; in the article "Intramolecular-Intermolecular Polymerization of Nonconjugated Diolefins" by C. S. Marvel, J. Poly Sci., Vol. XLVIII, pp. 101-108 (1960); and in the articles by J. F. Jones titled "Cyclopolymerization I. Polydiacrylyl-methane" and "Cyclopolymerization II. Polyacrylic Anhydride, " both appearing in J. Poly Sci. Vol. XXXIII (1958) pp. 7-14 and 15-20, respectively.

These polydiacrylyl methane polymers are prepared by the reaction of an ester of an acrylic acid of the structure.

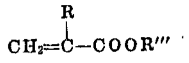

with a vinyl ketone of the structure

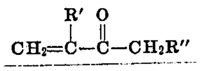

in the presence of an alkaline condensation agent, normally in the presence of an inert diluent. Details of the process may be found in the above citations.

Subsequent investigation indicated the resultant polymer appears to contain repeating units of the following structures

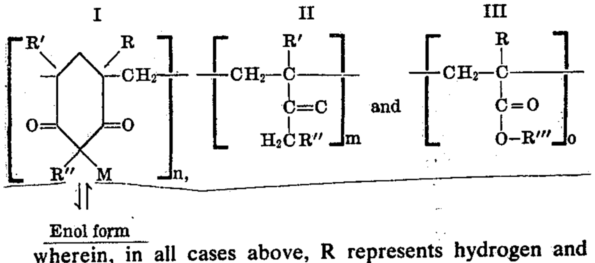

wherein, in all cases above, R represents hydrogen and hydrocarbon groups of one to 10 carbon atoms having no aliphatic unsaturation; R′ represents hydrogen and a lower alkyl group, a cycloaliphatic saturated hydrocarbon and a phenyl group; R″ is hydrogen and lower n-alkyl group of from one to about five carbon atoms; and R‴ is a hydrocarbon residue of a monohydric moiety of the ester and preferably an alkyl group, a cycloalkyl group or a phenyl group. In addition, *n* represents the amount of the repeating unit I in the products, which normally will be in the range of about 5 to about 80 mole percent of the polymer product; *m* represents the amount of the repeating unit II in the reaction product which normally will be in the range of about 10 to about 85 mole percent of the reaction product; and *o* represents the amount of repeating unit III in the reaction product which normally may extend in the range of about 2 to about 20 mole percent.

In view of the complex nature of resultant polydiacrylyl methane polymer products obtained, they are herein defined as "polymeric materials derived from the alkaline condensation of vinyl ketones and acrylates", and this definition is accordingly restricted thereto for purposes of this application and claims.

Among the acrylic esters suitable for use in the reaction, as indicated in the above referenced U.S. Pat. No. 2,978,436, are the alkyl, cycloalkyl and aryl esters of acrylic acid and a lower alphaalkyl, aryl or cycloalkyl acrylic acid. Specifically, these include but are not limited to compounds such as methyl acrylate, ethyl acrylate, n-propyl acrylate, isopropyl acrylate, the butyl acrylates, the amyl acrylates, the hexylacrylates, the heptyl acrylates and the octyl acrylates, cyclohexyl acrylates, methyl cyclohexyl acrylates, and lower alkyl substituted cyclohexyl acrylates, phenyl acrylate, tolyl acrylate, xylyl acrylate, naphthyl acrylates and other esters of acrylic acid and a mono- or poly-cyclic monophenol. The acid moiety of the acrylic ester can be an alphaalkyl, cycloalkyl or aryl substituted acrylic acid such as methacrylic acid, ethacrylic acid, alphapropyl acrylic or alphabutyl acrylic acid, alphapentyl acrylic acid or alphahexyl or cyclohexyl acrylic acid, or it can be an alphaaryl substituted acrylic acid such as alphaphenyl acrylic acid. As indicated above, these esters conform to the formula

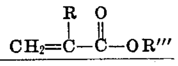

in which R is hydrogen and a hydrocarbon group of from about one to 10 carbon atoms free of aliphatic unsaturation, preferably hydrocarbon groups having from one to six carbon atoms free of aliphatic unsaturation.

The vinyl ketones suitable for use in preparation of these polydiacrylyl methane polymers, have the general structure

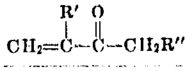

which include compounds in which R′ is hydrogen or a hydrocarbon group having from one to six carbon atoms with no aliphatic unsaturation, and R″ is a lower n-alkyl group of from one to about five carbon atoms. Representative ketones are those in which R′ is methyl, ethyl, a propyl, a butyl, a pentyl, a hexyl, a cyclohexyl or a phenyl group, and R″ is hydrogen or a n-lower alkyl group such as methyl ethyl, n-propyl, n-butyl and n-pentyl.

SUMMARY OF THE INVENTION

It has now been discovered, in accordance with this invention, that cinnamates and quinone diazide sulfonate esters of the above noted polydiacrylyl methane polymer products provide a new class of photoresist compositions to form polymeric image on suitable supports on exposure to light and development in appropriate solvents. Associated novel photosensitive or photoresist elements are also formed by coating a solution of the film-forming light-sensitive compositions on suitable supports by any of the methods well known in the art.

The cinnamates of the polydiacrylyl methane polymer products form negative resists which may be coated on a support from a solution thereof, followed by exposure to light in accordance with a predetermined pattern through a mask. The areas of the coating exposed to light, result in cross-linking to occur therein. The coating may then be developed to remove the unirradiated or unexposed portions of the coating. After processing of the portions of the support (exposed through the negative cross-linked or exposed resist pattern), as for example by etching, the exposed resist pattern may be stripped by solvents.

The quinone diazide sulfonate esters of the polydiacrylyl methane polymer products form, in contradistinction, a positive resist wherein the unexposed portions of a coating thereof constitute a mask image after dissolving away the exposed portions of the resist coating. As will be understood, the resist coating can be applied to a support element from solution in accordance with conventional techniques such as dip coating, spin casting, spraying and the like. Comprehended in this quinone diazide sulfonyl ester embodiment is the inclusion or addition of alkali-soluble resins such as phenolic resins which are condensation products of phenols and formaldehyde commonly known as "novolaks", as for example m-cresol-formaldehyde, one of which is commercially available under the trademark "Alvonol 429K". As employed herein, the term "phenolformaldehyde" generally comprehends resins produced from formaldehyde and phenols, inclusive of substituted phenols.

Accordingly, it is an object of this invention to provide novel photoresist compositions.

Another object of this invention is to provide novel photosensitive polymers for use in photoresist applications.

A further object of this invention is to provide novel negative photoresist compositions.

A still further object of this invention is to provide novel positive photoresist compositions.

It is also an object of this invention to provide novel photosensitive elements including a suitable support coated with a layer of the photoresist compositions disclosed herein.

The foregoing and other objects, features and advantages of the invention will be apparent from the following more particular description of preferred embodiments of the invention.

DESCRIPTION OF THE PREFERRED EMBODIMENTS

Novel photoresist systems have been discovered, in accordance with this invention based on film-forming light sensitive cinnamates and quinone diazide sulfonates of the above noted polydiacrylyl methane polymer products. These esterified resists appear to contain the following characteristic repeating units:

I II III

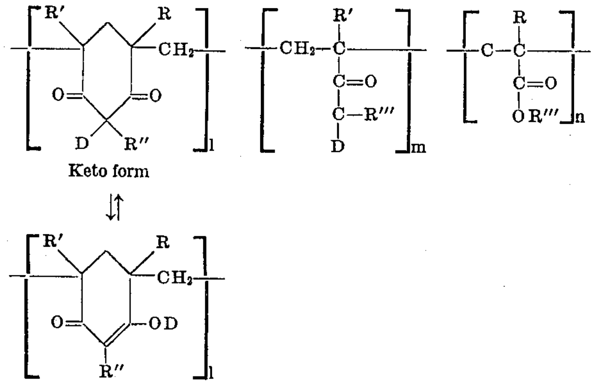

Keto form ⇅ Enol form wherein D, throughout the polymer is selected from either a cinnamate or a quinone diazide sulfonate moiety, and *l*, *m* are whole numbers and *n* is either zero or a whole number, depending upon the degree of polymerization of the original polydiacrylyl methane polymeric backbone. Also, as defined above, R represents hydrogen and hydrocarbon groups of from about one to about 10 carbon atoms free of aliphatic unsaturation and preferably R is hydrogen and a hydrocarbon group of one to six carbon atoms free of aliphatic unsaturation; R' represents hydrogen and a lower alkyl group, a cycloaliphatic saturated hydrocarbon group and a phenyl group; R'' is hydrogen and lower n-alkyl group of from one to about five carbon atoms; and R''' is an alkyl group, a cycloalkyl group or a phenyl group.

It is to be understood, however, as noted above, in view of the highly complex nature of these products, they are defined for purposes of this application, inclusive of claims, as "-polymer products derived from the alkaline condensation of vinyl ketones and acrylates."

Of these resist systems, the cinnamates of the above defined polydiacrylyl methane polymer products appears to conform to polymeric structures having characteristic repeating units

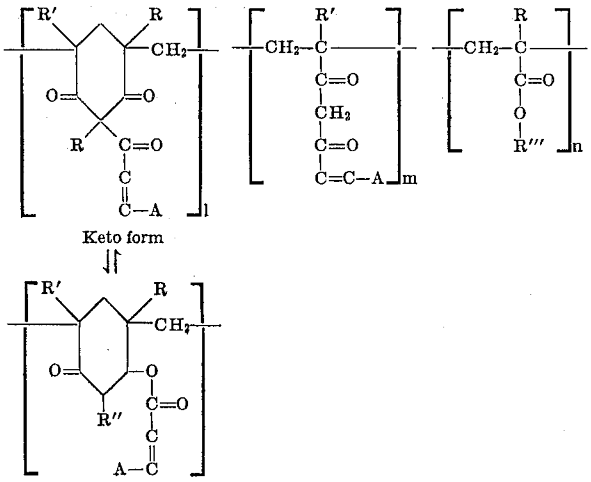

Keto form ⇅ Enol form wherein A is an aryl group of the benzene series, as, for example, phenyl, chlorophenyl, methoxy phenyl, nitro phenyl and the like. The remaining moieties R, R', R'' and R''', and *l*, *m* and *n* have the same designation as indicated above.

The cinnamate resist embodiments are obtained by reacting the polydiacrylyl methane polymer products with any of the presently available cinnamoylating compounds, in an inert solvent, followed by suitable precipitation of the cinnamated polymeric product. Typical cinnamoylating agents useful in the reaction are the cinnamoyl halides such as cinnamoyl chloride, o-chlorocinnamoyl chloride, m-nitrocinnamoyl chloride, α-phenyl-cinnamoyl chloride, and the like.

Numerous solvents are suitable for use in the reaction, illustrative of which are pyridine, aliphatic amines, substituted pyridines, acetone, methyl glycol acetate, aq. sodium hydroxide, mineral acids, and mixtures thereof, and the like.

The conditions under which the cinnamated product may be produced may be varied over fairly wide ranges. The charge mixture of the reactants may be in a weight ratio of from about 1 to about 1.5 parts of the polydiacrylyl methane polymer products to 0.5 to 3 parts of the cinnamoylating agent, and preferably from about 1 to about 100 parts of the solvent which is not critical.

The reaction may be carried out at any elevated temperature below the boiling point of the solvent, but normally will be at temperatures in the range from about 25° to about 50° C., and preferably in the range from about 30° to about 40° C.

The resultant cinnamated composition may then be precipitated by use of water, alcohols or other agents compatible with the reaction solvent and which insolubilize the cinnamated composition.

The cinnamate content of the resultant composition is substantially determined by the proportion of the cinnamoylating agent and the polydiacrylyl methane polymer products present in the reaction. In general, the product may contain from about 30 to about 200 mole percent of the cinnamate moiety, where either one or both the reactive protons may be replaced by

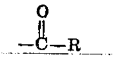

group, and preferably from about 25 to about 80 mole percent of the cinnamate moiety, which will produce corresponding variations in the light sensitivity of the composition. The sensitivity of the composition may in effect be also varied by variations in the molecular weight of the polydiacrylyl methane polymer products which normally may be in the range of about $5\times10^2$ to about $3\times10^5$. In general, polydiacrylyl methane polymer products having a minimum molecular weight of about $10^3$ to about $3\times10^3$ are particularly useful in the positive photoresist compositions, whereas the ones in the high molecular weight region are more particularly useful in the negative photoresist compositions, wherein higher molecular weight polymers have corresponding efficacy.

In use, the photosensitive compositions are applied as a solution, in a suitable solvent commonly employed in the art for coating polymers on substrates used conventionally for photoresist elements. Typical solvents include the ketones such as cyclohexanone, 2-butanone, acetone, etc., dimethyl formamide, tetrahydrofuran, pyridine, benzene, toluene, etc., and mixtures thereof. The specific choice of solvent will, in general, depend on the specific environment comprehended for the resist system, inclusive of the substrate to be coated.

Although the above cinnamated compositions are inherently photosensitive, their sensitivity can be measurably increased by the addition of sensitizers conventionally employed to sensitize cinnamates, as for example 2,6-di-(4'-azidobenzal) cyclohexanone, naphtha thiazolines, coumarones, and the like. The relative proportions of the sensitizers to the above cinnamated compositions may be varied as desired or as conditions may require, but ordinarily the proportion of the sensitizer in the dried compositions will be, by weight, within the range of about 0.2 to about 10 percent thereof, and usually from about 1 to about 3 percent of the sensitized/cinnamated compositions.

Photoinsolubilization (e.g., cross-linking) of these cinnamated compositions (with or without sensitizers) can be effected simply by exposing the composition to a source of actinic radiation of any source and of any type. The light source need only furnish sufficient radiation, preferably ultraviolet, to induce the desired solubilization of the compositions. Typical sources of light include carbon arcs, mercury vapor lamps and the like. It is to be understood that the effect of exposure is not always to insolubilize the photoresist composition or organic solvents, and in some cases it may be necessary to choose the developing solvent with a certain degree of care.

These cinnamated resist compositions can be coated on a support by any of the conventional methods used in the photoresist art which can include dipping, spraying, spin-coating, etc. After application of the coating, the solvent is driven off, as by evaporation, to leave a thin coating of the photosensitive composition on the support, after which the coating may be exposed to suitable radiation in accordance with conventional techniques employed in the photomechanical and photolithographic arts. Typical supports include any various base materials to which the photosensitive composition will adhere, such as glass, paper, resin impregnated or reinforced pater, solid resinous sheets, metal sheets such as aluminum, zinc, magnesium, copper, etc., and the like.

After the support member has been coated, with a film of the photosensitive cinnamated compositions and dried, it is then exposed to light (e.g., ultraviolet) in a predetermined pattern corresponding to the ultimate pattern desired. Generally, such exposure is effected by means of suitable masks, stencils, templates, etc. In any event, such exposure induces photopolymerization or insolubilization of the coating in the exposed areas thereof. The exposed coating may then be developed by treating it in any suitable solvent such as listed above. Generally, because of the differential insolubility which has been induced, the solvent developer may be the same solvent in which the composition was originally dissolved, e.g., prepared in. In the development stage, the unexposed areas are softened and dissolved off leaving a resist image corresponding to the exposed areas in which photoinsolubilization was induced.

If desired, the coated plate may be subjected to optional heat treatments to enhance the resolution of the exposed areas. For example, the exposed coating may be prebaked at low temperatures (e.g., about 50° to about 110° C. for a short period of time, e.g., 10 to about 60 minutes, to increase the polymerization of the coating. Also, post-heat treatment may be employed after development to increase the strength of the resist image. For the post-bake, the film and support may be oven-baked below the softening point of the support for suitable times which illustratively may be of the order of about 140°-220° C. and 6 hours, depending on the further processing requirements of the support.

A typical application for these cinnamated photosensitive compositions is in the fabrication of semiconductor devices. In such application, the photosensitive cinnamated composition may be coated on an oxidized surface of a semiconductor substrate followed by exposure of the coating (after drying) in a predetermined pattern via a mask.

However, it is to be understood that the photosensitive cinnamated compositions of this invention are also suitable for other uses as indicated above. For example, they can be applied for the manufacture of printed circuits, chemical milling and in various general fields of photomechanical and photographical reproduction, lithography, and intaglio printing, such as offset printing, silk screen, manifold stencil sheeting coatings, lithographic plates, gravure plates, and the like.

As indicated above, the quinone diazide sulfonated polydiacrylyl methane polymer products form positive photoresist systems, and appear to conform to polymeric structures having characteristic repeating units

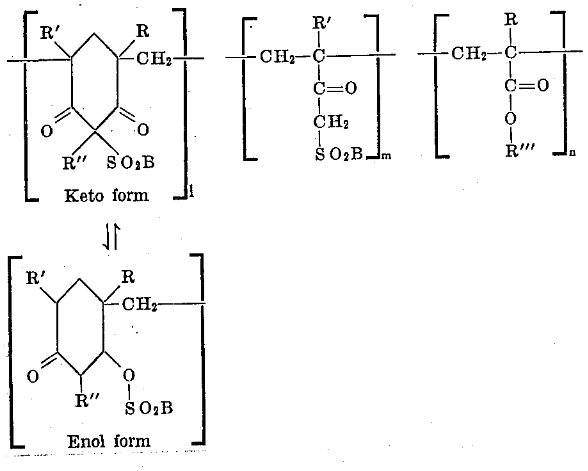

wherein B is a quinone diazide group, with the quinone diazide sulfonyl moiety (e.g., $BSO_2$—) represented by radicals obtained from the ester and amide derivatives of diazoketonaphthalene sulfonic acids such as the 5-sulfonic acid of 2-diazonaphthol-1, naphthoquinone-(1,2)-diazide-(2)-5-sulfones, inclusive of their derivatives wherein the naphthalene nucleus is substituted by halogen atoms, lower alkyl groups, nitro groups, alkoxy groups, and the like. The remaining substituents R, R', R'', R''' and *l*, *m* and *n*, have the same designations indicated above.

The quinone diazide sulfonated embodiments are obtained by reacting the polydiacrylyl methane polymer products with a halide of the quinone diazide sulfonic acid indicated above. Typical of these halides are naphthoquinone-1,2-diazide-5-sulfonyl chloride, and naphthoquinone-1,2-diazo-4-sulfonyl chloride.

Numerous solvents are suitable for reaction, illustrative of which are dioxane, methyl-ethyl-ketone, pyridine, carbon tetrachloride, toluene, and mixtures thereof, and the like. Pyridine and other amines may be used either as catalysts or solvents or both.

As with the preceding embodiment, the conditions under which these quinone diazides sulfonated products may be produced can be varied over fairly wide ranges. The charge mixture of the reactants may be in a weight ratio of from about 1 to about 2 parts of the polydiacrylyl polymer products to about 0.2 to about 1.0 parts of the quinone diazide sulfonating agent, and preferably from about 0.2 to about 100 parts of the solvent. The reaction may be carried out at any elevated temperature below the decomposition temperature of the reactants and the boiling point of the solvent, but normally will be at temperatures in the range from about −30° to about +50° C., and preferably in the range from about 0° to about −5° C.

The quinone diazide sulfonate content of the resultant composition is determined by proportions of the sulfonating agent and polydiacrylyl methane polymer products employed in the reaction. In general, the product may contain from about 5 to about 75 mole percent of the quinone diazide sulfonate moiety and preferably from about 20 to about 30 mole percent of the quinone diazide sulfonate moiety, which will produce corresponding variations in the sensitivity of the composition. The sensitivity of the compositions may, in effect, be also varied by variations in a molecular weight of the polydiacrylyl methane polymer products which normally may be in the range of about $5\times10^2$ to about $3\times10^5$, and preferably in a range of about $10^3$ to about $3\times10^3$. In general, polydiacrylyl methane polymer products having a minimum molecular weight of about $2\times10^2$ are useful in the composition.

In use, the sulfonated diazide photosensitive compositions of this invention are applied in a conventional manner from a solution, in a suitable solvent, commonly employed in the art for coating polymers on suitable supports or substrates used conventionally for photoresist elements. Typical solvents include organic solvents such as ethylene glycol, monomethyl ether, dioxane, glycol monoethyl ether, xylene, n-butyl acetate, methyl cellosolve, methyl cellosolve acetate, etc., and/or appropriate mixtures of such solvents. If desired, the above sulfonated polydiacrylyl methane polymer products may be combined with a wide variety of alkali-soluble base resins. These include natural resins such as shellac and synthetic resins such as copolymers of styrene and maleic anhydrides, and preferably the condensation products of phenols and formaldehyde, commonly known as phenolic resins such as "the Novalaks" represented by m-cresol-formaldehyde, one of which is commercially available under the trademark "Alvonol–K". As employed herein, the term phenolformaldehyde generally comprehends resins produced from formaldehyde and phenols, inclusive of substituted phenols. Typical phenolic compounds are cresol, xylenol, ethylphenol, butylphenol, isopropolmethoxyphenol, chlorophenol, resorcinol, naphthol, hydroquinone, and the like.

The ratio on the alkali-soluble base resin to the sulfonated polydiacrylyl methane polymer products can be varied over a wide range. Effective resist can be formulated with alkali-soluble base resin making up from about 5 to about 75 percent of the weight of the sulfonated polymer products employed. Usually the range is from about 100 to about 50 percent of the weight of the sulfonated polymer products, and preferably from about 20 to about 30 percent of the weight of the sulfonated polydiacrylyl methane products.

The film-forming photosensitive compositions are formed in solutions of sulfonated polymer products of this invention, alone or in combination with the alkali-soluble resins, which can be coated on a support by any of the conventional methods used in the photoresist art which can include dipping, spraying, spin-coating, etc.. After application of the coating, the solvent is driven off to leave a thin coating of the photosensitive composition on the support after which the coating may be exposed to suitable radiation in accordance with conventional techniques employed for positive photoresist in the photomechanical and photolithographical arts. Typical supports, as with the preceding embodiment, include any of the various base materials to which photosensitive compositions will adhere such as glass, paper, resin impregnated or reinforced paper, solid resinous sheets, metal sheets such as aluminum, zinc, magnesium, copper etc., and the like.

After the support member has been coated with a film of the sulfonated photosensitive composition and dried, it is then exposed to light, (e.g., ultraviolet) through a positive master containing a pattern of opaque and transparent areas in a predetermined pattern corresponding to the ultimate pattern desired. Generally, such exposure is effected by means of suitable masks, negatives, stencils, templates, etc. In any event, such exposure induces solubilization of the exposed areas in dilute basic solutions.

The exposed unit is subsequently developed in alkali solutions in accordance with the conventional techniques to dissolve the exposed areas and to retain the unexposed areas. Such developers typically include dilute solution of sodium hydroxide, trisodium phosphate, sodium metasilicate and the like, and including mixtures thereof. Conventionally, if desired or necessary, the developers may include wetting agents, water-miscible organic solvents, binders and the like. In the development stage, the exposed areas are dissolved off, leaving a resist image corresponding to the unexposed areas forming a positive resist mask.

If desired, the resist-masked substrate may be subjected to an optional heat treatment to enhance the resolution of the exposed areas, e.g., to further harden the retained resist. For example, the retained resist coating may be prebaked at low temperatures, e.g., about 70 to about 100° C. for a short period of time, e.g., about 10 to about 60 minutes to harden the retained coating.

A typical application for these sulfonated photosensitive compositions of this invention is also in the fabrication of semiconductor devices. In such an application, the sulfonated photosensitive composition (with or without the alkali-soluble resins) may be coated on the oxidized surface of a semiconductor substrate followed by exposure of the coating (after drying) in a predetermined pattern via a positive mask, corresponding to the area of the oxide desired to be bared for further processing. The exposed coating is then developed to bare the oxide layer for further processing which, for example, may then be conventionally etched into appropriate openings as desired or required. It is to be understood however, that the sulfonated photosensitive composition of this invention are also suitable for other uses as indicated above. For example they can be applied for the manufacture of printed circuits, chemical milling and in the various general fields of photomechanical and photographical reproductions, lithography and intaglio printing, such as offset printing, silk screen printing, manifold stencil sheeting coatings, lithographic plates, relief plates, gravure plates and the like.

The following example is set forth to illustrate the photosensitivity of the resist compositions of the invention.

EXAMPLE I

A polydiacrylyl methane "Composition A" was prepared by adding, to 129 g. of butyl acrylate and 54 g. sodium methoxide in 500 ml. of toluene at 80° C., 70 g. of methyl vinyl ketone in drop-by-drop fashion, with the mixture stored for 5 hours at −80° C. The mixture was then brought slowly to room temperature, and dissolved in water followed by filtering and acidification with acetic acid to precipitate the product which was then dried at 60° C. under a vacuum. 76 g. of the product was obtained constituting composition A.

To 6.2 g. composition A was added 30 cc. of pyridine followed by heating to 50° C. for 4 hours. The mixture was then cooled followed by addition of 8.4 g. of cinnamoyl chloride. The reaction mixture was then stored at 50° C. for 4 hours. Upon cooling 200 cc. of acetone was added, and the solution filtered. The acetone-pyridine solution was added to water and the precipitated polymer was filtered. After drying, the product at 60° C. under vacuum, 8 g. of the cinnamated polydiacrylyl methane polymer product was isolated.

An 18 wt. percent solution of the cinnamated product was prepared in an 86/14 solvent mixture, to which was added 3.5 wt. percent (based on the cinnamated product) 2,6-di($4^1$-azobenzal)-4-methycyclohexanone dissolved in a small about of the xylene/methyl cellosolve acetate. The solution was filtered through a 1.2 micron filter.

The sensitized solution was then coated on an oxidized surface of a silicon wafer by spin-coating. The coated wafer was then prebaked for 7 minutes at 100° C., exposed through a mask with a super pressure 200 watt U.V. lamp for 12 seconds, developed for 2 minutes in chlorobenzene/cyclohexanone solvent mixture, postbaked for 1 hour at 180° C., etched in 7/1 buffered HF and stripped with phenol/dichlorobenzene/tetrachloro ethylene stripper and sulfuric acid at 140° C. High resolution of 2.0–3.5 micron line was obtained.

EXAMPLE II

A sodium salt of polydiacrylyl methane polymer products of Composition B was prepared from 100 g. ethyl acrylate, 54 g. sodium methoxide and 70 g. of methyl vinyl ketone at 80° C. in 500 ml. diethyl ether in accordance with the preceding procedure of Example I. 140 g. of the sodium salt was obtained.

To 3.15 g. of the sodium salt obtained above, was added 0.65 g. of sodium methoxide in 25 ml. dioxane. To this was added 8.1 g. (0.30) of 2-diazo-1-naphtho-5-sulfonyl chloride dissolved in 25 ml. dioxane. The dioxane solution was filtered, dissolved, evaporated and the product washed with water. 4.5 g. of water insoluble material was obtained showing $=N_2$ peak in I.R.

After coating an oxidized surface of a silicon wafer with the sulfonated product, followed by exposure of the coating to a 200 watt U.V. lamp through a mask, which after development, provided lines of 2 to 35 micron resolution.

EXAMPLE III

A polydiacryl methane polymer product of Composition C was prepared from 30 g. ethyl acrylate, 136 g. sodium methoxide 17.5 g. of methyl vinyl ketone in toluene at −5° C. After 4 hours, the product was brought to room temperature and filtered. The sodium salt obtained was dissolved in water and acidified with 10% HCL. The product was dried under vacuum at 60° C.

3.1 g. (0.025 mole) of this Composition C product was dissolved in 25 ml. pyridine, and 8.1 (0.03 mole) of 2-diazo-1-naphtho-5-sulfonyl chloride (dissolved in pyridine) was added. They were allowed to react for 3 hours followed by addition of acetone with subsequent filtering. The filtrate was added to water, acidified with HCL to precipate the sulfanated product.

EXAMPLE IV

A positive photoresist was obtained as follows:

One part of the quinone diazide sulfonated product of Composition B of Example II was mixed with five parts of unsulfonated polydiacrylyl methane polymer products of the same Composition B, and dissolved in dioxane/methanol/methoxy ethanol, (37.5/12.5/50) to get a 34 percent solution. After filtering through a 1.5 micron filter, the filtrate was spin-coated at 3,700 r.p.m. on an oxidized surface of a silicon wafer. The coated wafer was then prebaked at 78° C. for 15 minutes, exposed through a positive mask for 30 seconds and developed in an aqueous solution of sodium phosphate/sodium meta silicate. Lines of 3.5 micron resolution were obtained.

EXAMPLE V

A positive photoresist was obtained by dissolving one part by weight of the sulfonated product of Composition C (of Example II above) is methanol/dioxane/methoxyethanol (12.5/37.5/50.0) to which was added five parts of m-cresol-formaldehyde resins (commercial Alvonol 429K Novolak resin), and the mixture dissolved in xylene/methanol/methoxyethanol acetate/butyl acetate/ (10/10/50/30) to give a 34 percent solution. The solution was spin-coated on an oxidized surface of a silicon wafer at 3,700 r.p.m., prebaked at 78° C., exposed through a positive mask for 30 seconds, and developed in an aqueous solution of sodium phosphate/sodium meta silicate.

The developed wafer was then postbaked at 120°–130° C. for 1 hour, and etched with 7/1 buffered hydrofluoric acid, followed by stripping of the unexposed resist with a stripper made of phenol/dichlorobenzene/tetrachloroethylene. Lines of 3.5 micron resolution were obtained.

EXAMPLE VI

A positive photoresist was obtained by dissolving one part by weight of the sulfonated product of Example III in a methanol/dioxane/methoxyethanol(12.5/37.5/50/0) solvent mixture to which was added five parts by weight of m-cresol-formaldehyde (commercial Alvonol 429K Novolak resin), with the mixture dissolved in a xylene/methoxyethanol acetate/(10/10/50/30) solvent mixture to give a 34 percent solution. This solution was then spin coated on an oxidized surface of a silicon wafer at 3,700 r.p.m., prebaked for 30 minutes at 78° C., exposed for 30 seconds through a positive mask and developed in the developer solution of the immediately preceding example. The developed wafer was then postbaked at 120°–130° C. for 1 hour, etched with 7/1 buffered HF, and stripped with the stripper solution of the immediately preceding example. Line resolutions of 3.5 microns were obtained.

While this invention has been particularly described with reference to the preferred embodiment thereof, it will be understood by those skilled in the art that the foregoing and other changes in form and detail may be made therein without departing from the spirit and scope of the invention.

What is claimed is:

1. A film-forming light-sensitive photoresist coating composition selected from the group of cinnamate and quinone diazide sulfonyl esters of polymeric diacrylyl methane material derived from the alkaline condensation of an n-alkyl vinyl ketone and an alkyl, aryl, or cycloalkyl ester of an acrylic acid.

2. The composition of claim 1 wherein said polymeric material comprises the alkaline condensation products of methyl vinyl ketone and alkyl acrylate.

3. The composition of claims 2 wherein said alkyl is a saturated hydrocarbon group of one to six carbon atoms.

4. The composition of claim 1 wherein said composition constitutes a negative resist comprised of a cinnamate ester of said polymeric material.

5. The composition of claim 4 wherein said ester comprises 30 to 200 mole percent of said polymeric material.

6. The composition of claim 4 wherein said polymeric material comprises the alkaline condensation products of methyl vinyl ketone and alkyl acrylate.

7. The composition of claim 6 wherein said ester comprises 30 to 200 mole percent of said polymeric material.

8. The composition of claim 6 wherein said alkyl is a saturated hydrocarbon group of one to six carbon atoms.

9. The composition of claim 8 wherein said ester comprises 30 to 200 mole percent of said polymeric material.

10. The composition of claim 1 wherein said composition constitutes a positive resist comprised of a quinone diazide sulfonyl ester of said polymeric material.

11. The composition of claim 10 wherein said ester comprises 5 to 75 mole percent of said polymeric material.

12. The composition of claim 10 including a phenolic resin therein.

13. The composition of claim 12 wherein said ester comprises 5 to 75 mole percent of said polymeric material.

14. The composition of claim 12 wherein said phenolic resin is a thermoplastic novolak resin present in an amount of about 5 to about 85 wt. percent of said composition.

15. The composition of claim 14 wherein said ester comprises 15 to 95 mole percent of said polymeric material.

16. The composition of claim 10 wherein said polymeric material comprises the alkaline condensation products of methyl vinyl ketone and alkyl acrylate.

17. The composition of claim 16 wherein said ester comprises 5 to 75 mole percent of said polymeric material.

18. The composition of claim 16 including a phenolic resin therein.

19. The composition of claim 18 wherein said ester comprises 5 to 75 mole percent of said polymeric material.

20. The composition of claim 18 wherein said phenolic resin is a thermoplastic novolak resin present in an amount of about 5 to about 85 wt. percent of said composition.

21. The composition of claim 20 wherein said ester comprises 5 to 95 mole percent of said polymeric material.

22. A light sensitive element comprising a support and a coating thereon of a composition selected from the group of cinnamate and quinone diazide sulfonyl esters of polymeric diacrylyl methane material derived from the alkaline condensation of an n-alkyl vinyl ketone and an alkyl, aryl, or cycloalkyl ester of an acrylic acid.

23. The element of claim 22 wherein said polymeric material comprises the alkaline condensation products of methyl vinyl ketone and alkyl acrylate.

24. The element of claim 23 wherein said alkyl is a saturated hydrocarbon group of one to six carbon atoms.

25. The element of claim 22 wherein said composition constitutes a negative resist comprised of a cinnamate ester of said polymeric material.

26. The element of claim 25 wherein said ester comprises 30 to 200 mole percent of said polymeric material.

27. The element of claim 25 wherein said polymeric material comprises the alkaline condensation products of methyl vinyl ketone and alkyl acrylate.

28. The element of claim 27 wherein said ester comprises 30 to 200 mole percent of said polymeric material.

29. The element of claim 27 wherein said alkyl is a saturated hydrocarbon group of one to six carbon atoms.

30. The element of claim 29 wherein said ester comprises 30 to 200 mole percent of said polymeric material.

31. The element of claim 22 wherein said composition constitutes a positive resist comprised of a quinone diazide sulfonyl ester of said polymeric material.

32. The element of claim 31 wherein said ester comprises 5 to 75 mole percent of said polymeric material.

33. The element of claim 31 including a phenolic resin therein.

34. The element of claim 33 wherein said ester comprises 5 to 75 mole percent of said polymeric material.

35. The element of claim 33 wherein said phenolic resin is a thermoplastic novolak resin present in an amount of about 5 to about 85 wt. percent of said composition.

36. The element of claim 35 wherein said ester comprises 15 to 95 mole percent of said polymeric material.

37. The element of claim 31 wherein said polymeric material comprises the alkaline condensation products of methyl vinyl ketone and alkyl acrylate.

38. The element of claim 37 wherein said ester comprises 5 to 75 mole percent of said polymeric material.

39. The element of claim 37 including a phenolic resin in said composition.

40. The element of claim 39 wherein said ester comprises 5 to 75 mole percent of said polymeric material.

41. The element of claim 39 wherein said phenolic resin is a thermoplastic novolak resin present in an amount of about 5 to about 85 wt. percent of said composition.

42. The element of claim 41 wherein said ester comprises 5 to 75 mole percent of said polymeric material.

* * * * *